(12) United States Patent
Fechner et al.

(10) Patent No.: US 7,553,786 B2
(45) Date of Patent: *Jun. 30, 2009

(54) GLASS THAT WITHSTANDS HIGH-TEMPERATURES FOR LAMP BULBS, AND ITS USE

(75) Inventors: Joerg Hinrich Fechner, Mainz (DE); Franz Ott, Mitterteich (DE)

(73) Assignee: Schott AG, Mainz (DE)

( * ) Notice: Subject to any disclaimer, the term of this patent is extended or adjusted under 35 U.S.C. 154(b) by 662 days.

This patent is subject to a terminal disclaimer.

(21) Appl. No.: 11/236,782

(22) Filed: Sep. 27, 2005

(65) Prior Publication Data

US 2006/0068982 A1 Mar. 30, 2006

(30) Foreign Application Priority Data

Sep. 30, 2004 (DE) .................. 10 2004 048 097

(51) Int. Cl.
*C03C 3/087* (2006.01)
(52) U.S. Cl. ........................................ 501/70; 313/636
(58) Field of Classification Search .................... 501/70, 501/69; 313/636
See application file for complete search history.

(56) References Cited

U.S. PATENT DOCUMENTS

| | | | |
|---|---|---|---|
| 3,310,413 A | | 3/1967 | Harrington |
| 3,496,401 A | | 2/1970 | Dumbough, Jr. |
| 3,978,362 A | | 8/1976 | Dumbaugh, Jr. et al. |
| 4,060,423 A | | 11/1977 | Thomas |
| 4,105,826 A | | 8/1978 | Thomas |
| 4,441,051 A | | 4/1984 | Thomas |
| 4,737,685 A | | 4/1988 | Thomas |
| 6,069,100 A | * | 5/2000 | Naumann et al. ............. 501/67 |
| 6,417,124 B1 | * | 7/2002 | Peuchert et al. ............... 501/66 |
| 6,989,633 B2 | * | 1/2006 | Kunert et al. ................ 313/636 |
| 7,137,278 B2 | * | 11/2006 | Ott et al. .................... 65/134.3 |
| 7,211,957 B2 | * | 5/2007 | Bergmann et al. .......... 313/636 |
| 7,390,761 B2 | * | 6/2008 | Fechner et al. ................ 501/64 |
| 2003/0181309 A1 | * | 9/2003 | Kunert et al. ................. 501/71 |
| 2004/0029702 A1 | * | 2/2004 | Naumann et al. ............. 501/70 |
| 2005/0096209 A1 | * | 5/2005 | Kase et al. .................... 501/56 |
| 2005/0181926 A1 | * | 8/2005 | Fechner et al. ................ 501/70 |
| 2006/0279217 A1 | * | 12/2006 | Peuchert et al. ............. 313/634 |

FOREIGN PATENT DOCUMENTS

| | | |
|---|---|---|
| DE | 27 33 169 | 2/1978 |
| DE | 29 30 249 | 2/1980 |
| DE | 33 05 587 A1 | 9/1983 |
| DE | 37 36 887 A1 | 6/1988 |
| DE | 197 47 355 C1 | 6/1999 |
| GB | 2 032 909 A | 5/1980 |
| WO | WO 03/064339 A2 * | 8/2003 |

OTHER PUBLICATIONS

Derwent Abstract 2003-636790, English Abstract of WO 03/064339 and 7390761, Aug. 7, 2003.*

* cited by examiner

*Primary Examiner*—Karl E Group
*Assistant Examiner*—Elizabeth A Bolden
(74) *Attorney, Agent, or Firm*—Michael J. Striker

(57) ABSTRACT

The alumino-silicate glass for lamp bulbs with molybdenum components contains alkaline earth metals and has the following composition (in % by weight based on oxide): $SiO_2$>58 to 62, $Al_2O_3$ 15 to 17.5, MgO 0.1 to <1, CaO 5.5 to 14, SrO 0 to 8, BaO 6 to 17, $ZrO_2$ 0 to 1, $CeO_2$ 0 to 0.3, $TiO_2$ 0 to 5, $MoO_3$ 0 to 2, $Bi_2O_3$ 0 to 4, with a sum total amount of alkaline earth oxides from 11.6 to 29. In addition, the alumino-silicate glass is free of $B_2O_3$ so that it has a high thermal stability. Lamp bulbs made with this glass can withstand a bulb temperature of greater than 650° C.

9 Claims, No Drawings

GLASS THAT WITHSTANDS HIGH-TEMPERATURES FOR LAMP BULBS, AND ITS USE

BACKGROUND OF THE INVENTION

The invention relates to an alumino-silicate glass, which contains alkaline earth metals for lamp bulbs, which have molybdenum components and bulb temperatures of greater than 650° C., and its use.

High demands are placed on glasses for high-temperature lamps, which are generally understood to mean lamps having bulb temperatures of above 550° C. The glasses in question are alumino(boro)-silicate glasses which contain alkaline earth metals. The glasses must be essentially free of alkali metal oxides, since alkali metal ions interfere with the regenerative halogen cycle in the lamp. This is because during operation of the lamp there is a chemical equilibrium between formation and decomposition of tungsten halides in the tungsten vapor from the filament and the halogen/inert gas mixture. The decomposition reaction takes place at higher temperatures than the formation reaction, so that the tungsten is deposited back on the filament. If this cycle is interfered with by contaminating components, such as for example alkali metal ions, the tungsten is deposited not on the filament, but on the inside of the glass bulb, as an undesirable shiny black disruptive coating.

The patent literature already contains numerous documents, which relate to glasses for incandescent lamps. However, these glasses are afflicted with a very wide range of drawbacks.

U.S. Pat. No. 3,978,362 describe incandescent lamps with lamp bulbs made from glass which has a high CaO content (14-21% by weight).

Other documents claim glasses, which have specific ratios between CaO and BaO:

DE-B-27 33 169 relates to MgO-free glasses for seals with molybdenum in which the CaO:BaO weight ratio is between 0.6 and 1. These glasses are $B_2O_3$-free. Drawbacks of these glasses are: that when the lamp is operating they have an increased tendency to lamp blackening (deposits on the inner side of the bulb) and to the formation of white deposits (likewise on the inner side of the bulb). The glasses described here are also susceptible to crystallization during the production process.

DE 29 30 249 C2 relates to the use of specific glass compositions as bulb material, in which compositions the BaO:CaO weight ratio is between 2.3 and 3.5 (CaO:BaO between 0.28 and 0.43). The glasses described in the latter document are said to have an improved resistance to what is known as "reboil". Reboil is the tendency of the glass to form a large number of small bubbles of included gases when subjected to further processing with a flame or when reheated. This impairs the light transmission and weakens the reheated areas.

U.S. Pat. No. 4,060,423 describes $B_2O_3$-free glasses for Mo seals in which the $Al_2O_3/(BaO+CaO)$ weight ratio lies in the range from 0.6 to 1.

U.S. Pat. No. 4,298,388 also describe $B_2O_3$-free glasses for glass-Mo seals. These glasses are also MgO-free and have high CaO contents (up to 19.2% by weight). BaO is only an optional component.

DE 37 36 887 C2 describes $B_2O_3$-free, low-CaO glasses. These glasses have disadvantageously high working points.

Glasses, which require $B_2O_3$ for incandescent lamp bulbs are also known: For example, the glasses for seals with molybdenum described in U.S. Pat. No. 3,310,413 contain 4 to 9% by weight of $B_2O_3$. The sealing or bulb glasses described in DE 33 05 587 A1 also require 3 to 7% by weight of $B_2O_3$ and, moreover, high BaO contents (11-16% by weight). Such high $B_2O_3$ contents, in particular in combination with MgO, reduce the viscosity values, so that these glasses are unsuitable for halogen lamps with bulb temperatures of greater than 650° C., for example of approx. 700° C. The low stability of the glasses at high temperatures leads to the lamp bulb bulging, possibly even to such an extent that the bulb will explode. One example of such a glass is the commercially available glass VI, having the composition (in % by weight) 56.8 $SiO_2$; 16.4 $Al_2O_3$; 4.7 $B_2O_3$; 5.8 MgO; 7.8 CaO; 8.0 BaO, with an annealing point AP of 721° C.

The glasses disclosed in DE 197 58 481 C1 and DE 197 47 355 C1 also contain $B_2O_3$. They contain relatively small quantities of BaO.

U.S. Pat. No. 3,496,401 describes incandescent lamps made from an alumino-silicate glass containing alkaline earth metals and having a maximum alkali metal oxide content of 0.1% by weight, in particular made from glasses comprising $SiO_2$, $Al_2O_3$, 10-25% by weight of alkaline-earth metal oxides, the specific levels of which are not given in further detail, and 0-10% by weight of $B_2O_3$. The exemplary embodiments are either $B_2O_3$-free or contain at least 4% by weight of $B_2O_3$. The maximum permissible alkali metal oxide content is too high for the high bulb temperatures, of approx. 700° C. and, during operation of the lamp, will lead to blackening of the internal surface of the bulb.

In order to be used as glass for lamp bulbs, which contain molybdenum components as electrode material or electrical lead material, the thermal expansion of the glass must be adapted to that of molybdenum, so that a tight, stress-free seal between the metal and the glass is achieved.

This means that the glass must have a higher expansion coefficient at its setting temperature {set point} than Mo, i.e. the difference in expansion between Mo and the glass must be positive, in order to achieve a radial compressive stress in the glass which is beneficial to the sealing of Mo supply leads.

A further demand placed on a glass, which is to be suitable for use as glass for lamp bulbs, is that it be suitable for tube drawing. For this to be so, it must have sufficient crystallization stability.

SUMMARY OF THE INVENTION

The object of the invention is therefore to provide a glass, which can be subjected to high temperatures and which fulfils the above-mentioned demands placed on a material that is used for lamp bulbs having bulb temperatures of greater than 650° C.

According to the invention the alumino-silicate glass for lamp bulbs that have molybdenum components contains alkaline earth metals and has a composition, in % by weight on an oxide basis, of:

| | |
|---|---|
| $SiO_2$ | >58-62 |
| $Al_2O_3$ | 15-17.5 |
| MgO | 0.1-<1 |
| CaO | 5.5-14 |
| SrO | 0-8 |
| BaO | 6-17 |
| $ZrO_2$ | 0-1 |
| $CeO_2$ | 0-0.3 |
| $TiO_2$ | 0-5 |
| $MoO_3$ | 0-2 |

-continued

| | |
|---|---|
| $Bi_2O_3$ | 0–4 |
| $\Sigma$ RO | 11.6–29, | wherein RO is an alkaline earth metal oxide.

This alumino-silicate glass achieves the object according to the invention. This alumino-silicate glass, which contains alkaline earth metals, has very precisely proportioned ratios of ingredients, which vary only within relatively narrow limits, in order to provide all the desired properties.

The glass according to the invention contains >58 to 62% by weight of $SiO_2$. Lower contents would make the thermal expansion too high, while higher contents would make it too low. In both cases, the glass would not be suitable for Mo, which would result in halogen lamps, which leak. Preferably, the range lies between 59 and 61% by weight of $SiO_2$.

The glass contains 15 to 17.5% by weight of $Al_2O_3$. Departures from this range would also lead to incorrectly set coefficients of expansion. Moreover, lower contents would reduce the transformation temperature Tg, which would lower the thermal stability of the glass. Contents of between 15.3 and 17.2% by weight are preferred.

It is crucial to the invention, inter alia, that the glass is $B_2O_3$-free. This ensures a high transformation temperature $T_g$ and therefore a high thermal stability.

Up to 1.0% by weight of $ZrO_2$ may be present in the glass. It is preferable for from 0.05 to 1% by weight of $ZrO_2$ to be present in the glass. The $ZrO_2$ content in the glass contributes to achieving the desired high transformation temperature $T_g$ of >775° C.

The glass contains alkaline earth metal oxides in specific quantities and in a defined ratio with respect to one another:

The BaO content in the glass is 6 to 17% by weight (preferably >7–15% by weight, particularly preferably >10% by weight) and the CaO content in the glass is 5.5 to 14% by weight (preferably >8 to 13.5% by weight). Furthermore, the glass may contain up to 8% by weight of SrO. Similarly to BaO, SrO has the effect of increasing the viscosity. The high BaO content is useful for suppressing increased lamp blackening (deposits on the inside of the bulb) and the formation of white deposits (likewise on the inside of the bulb) when the lamp is operating. Also, in particular the susceptibility to crystallization during the production process is reduced or eliminated altogether. In particular, the particularly critical formation of anorthite, a Ca—Al silicate, which leads to glass defects during the drawing of tubes, is suppressed.

In addition, the glass contains up to <1% by weight of MgO. It contains at least 0.1% by weight, preferably at least 0.2% by weight, of MgO. Additions of MgO in particular to an alumino-silicate glass containing CaO and BaO contribute to strengthening of the glass network, because MgO, as a so-called "intermediate oxide", with $Mg^{2+}$ as a cation of higher field strength than $Ca^{2+}$ and $Ba^{2+}$, like $Al_2O_3$ and $SiO_2$, can perform a network-forming function. An MgO content of at least 0.5% by weight of MgO is particularly preferred.

The total content of the alkaline-earth metal oxides, RO, is no less than 11.6% by weight and is not to exceed 29% by weight, since otherwise both the thermal expansion coefficient and the viscosity would deviate from the desired values.

It is preferable for the ratio of the contents in % by weight of BaO to MgO to be between 17 and 21, in particular 18 to 20. The CaO/MgO ratio is preferably 13 to 17, in particular 14 to 15.

In lamps which are subjected to high temperatures, the halogen fill is generally a bromide-and/or chloride-containing gas, and impurities from the glass and from the filament, for example alkali metal ions, react with the bromide and/or chloride, in this case to form alkali metal bromides and/or alkali metal chlorides, which form a white deposit on the inner side of the glass of the bulb. This reduces the halogen concentration in the lamp and interferes with or even causes the failure of the regenerative halogen cycle.

$CeO_2$ in the glass has the effect of shifting the UV absorption edge towards longer wavelengths. Moreover, it acts as a refining agent. It has been found that $CeO_2$ reduces the problematic halide deposits on the inside of the bulb, thus also reducing the blackening during operation of the lamp.

For this reason the glass according to the invention may also contain up to 0.3% by weight of $CeO_2$. Higher contents would cause an interfering yellow discoloration to the glass. In a preferred embodiment, at least 0.005 percent by weight is present in the glass.

The glass may also contain further standard refining agents in quantities, which are customary for halogen lamp glasses.

Furthermore, the glass may-additionally contain up to 0.5% by weight of $TiO_2$. This component also shifts the UV edge towards the longer-wavelength spectral range, although to a lesser extent than $CeO_2$. Owing to $TiO_2$ reacting with iron impurities to form a colored iron titanate compound, higher contents would give the glass a brownish appearance. A $TiO_2$ content of at most 3% by weight is preferred, and a $TiO_2$ content of at most 2.5% by weight is particularly preferred. A $TiO_2$ content of at least 0.5% by weight is particularly preferred.

Furthermore, the glass can contain up to 2% by weight of $MoO_3$ and/or up to 4% of $Bi_2O_3$. The addition of $MoO_3$ and/or $Bi_2O_3$ allows the UV edge to be adjusted. Moreover $MoO_3$ assists with the refining of the glass.

It is preferable for the glass to be doped with the above-mentioned dopants in such a manner that it has a UV spectral transmission at a layer thickness of 1 mm and at 330 nm of between 55 and 62%, preferably 57 to 59%, in particular approx. 58%.

The alkali metal oxide contents and the water contents are also of importance.

The higher the operating temperatures of the lamp, the greater the demands placed on a very low content become. In the case of the glasses according to the invention, which are suitable for use as material for lamp bulbs having bulb temperatures of approx. 700° C., it is preferred for the alkali metal oxide content to be limited to less than 0.03% by weight and the water content to less than 0.02% by weight. As a result, because of the complete, precisely proportioned composition, in particular the ratios between the alkaline earth metals, the black discoloration is reduced, even at the high temperatures mentioned above and after prolonged operation of the lamp.

The alkali metal content can be kept at a low level by using raw materials with a low alkali metal content and by ensuring clean conditions during preparation of the batch and in the dog-house of the melting end.

The water content too can be kept sufficiently low by suitably selecting the raw materials and the melting conditions.

EXAMPLES

To produce the glasses of the examples, in each case raw material variants with a low alkali metal content were used for the oxide components, such as silica sand, aluminium oxide, magnesium carbonate, calcium carbonate and barium carbonate, as well as zircon sand. The well-homogenized batch was melted in the laboratory in a Pt/Rh crucible at: 1600 to 1680° C., refined and homogenized. The glass was then pulled vertically in a laboratory tube-pulling appliance. The glasses were free of undesired crystals.

Table I shows five examples of glasses according to the invention (A1-A5) and one comparative example (V), including their compositions (in % by weight based on oxide) and their significant properties.

Furthermore, the maximum crystal growth rate, $KG_{max}$ [µm/min], the upper devitrification temperature UDT (liquidus temperature) and the lower devitrification temperature LDT have been given. $KG_{max}$ [° C.] is to be understood as meaning the temperature at which maximum crystal growth occurs.

The example glasses of the invention and the comparative glass were heat-treated for 115 h at 1130° C., after which, their crystallite content was determined. The analysis of the ratio of crystalline phase to amorphous phase or the characterization of the crystalline phase was carried out by means of semi-quantitative X-ray diffraction analysis. The table gives (in %) the proportion of the amorphous phase and of the respective specific crystalline phases. Table I gives five exemplary embodiments (A1-A5) and comparative example (V).

TABLE I

COMPOSITIONS OF THE GLASSES (IN % BY WEIGHT) AND THEIR SIGNIFICANT PROPERTIES

|  | A1 | A2 | A3 | A4 | A5 | V |
|---|---|---|---|---|---|---|
| $SiO_2$ | 59.7 | 60.3 | 59.1 | 59.2 | 58.2 | 51.53 |
| $Al_2O_3$ | 16.1 | 15.7 | 16.1 | 16.4 | 16.1 | 20.03 |
| $B_2O_3$ | — | — | — | — | — | 1.87 |
| MgO | 0.7 | 0.9 | 0.7 | 0.7 | 0.7 | — |
| CaO | 10.2 | 10.2 | 10.2 | 10.2 | 10.2 | 6.43 |
| SrO | — | — | — | — | — | 3.37 |
| BaO | 13.3 | 12.9 | 13.3 | 13 | 13.3 | 15.13 |
| $ZrO_2$ | — | 0.1 | — | — | — | 1.65 |
| $TiO_2$ | — | — | — | 0.5 | 1.5 | — |
| $MoO_3$ | — | — | 0.5 | — | — | — |
| $Bi_2O_3$ | — | — | 0.1 | — | — | — |
| $\alpha_{20/300}$, $10^{-6}$/K | 4.73 | 4.79 | 4.72 | 4.69 | 4.81 | n.d. |
| Tg [° C.] | 794 | 791 | n.b. | 792 | 789 | n.d. |
| $V_A$ [° C.] | 1327 | 1323 | 1315 | 1332 | 1325 | n.d. |
| $KG_{max}$ [µm/min] | 0.4 | n.d. | n.d. | n.d. | n.d. | n.d. |
| $KG_{max}$ [° C.] | 1125 | n.d. | n.d. | n.d. | n.d. | n.d. |
| UDT [° C.] | 1225 | n.d. | n.d. | n.d. | n.d. | n.d. |
| LDT [° C.] | 1110 | n.d. | n.d. | n.d | n.d. | n.d. |
| $\tau_{(330\ nm/1\ nm)}$ | 72.31 | 72.1 | 57.9 | 60.1 | 57.4 | n.d. |
| $\tau_{(330\ nm/1\ nm)\ after\ 15\ h\ HOK-4}$ | 65.02 | n.d. | n.d. | 60.1 | 57.3 | n.d. |
| Glass/Glass fuse seal, nm/cm | +25 | n.d. | n.d. | n.d. | n.d. | n.d. |
| Heat treatment 115 h at 1130° C.: |  |  |  |  |  |  |
| Cristobalite ($SiO_2$) | <1% | <1% | <1% | <1% | <1% | — |
| Ba.Si—Feldspar (mkl) | — | — | — | — | — | 15% |
| Celsian ($BaAl_2SiO_8$) | — | — | — | — | — | — |
| Zircon ($ZrSiO_4$) | — | — | — | — | — | — |
| Baddeleyite ($ZrO_2$) (mkl) | — | — | — | — | — | — |
| Anorthite ($CaAl_2Si_2O_8$) | — | — | — | — | — | 9% |
| amorphous phase | >99% | >99% | >99% | >99% | >99% | 76% | n.d. = not determined

In addition to the transformation temperature ($T_g$) and the temperature at a viscosity of $10^4$ dPas ($V_A$), the coefficient of thermal expansion $\alpha_{20/300}$ ($\times 10^{-6}$/K) are given, as well as i.e. the transmission at thickness of 1 mm and the transmission $\tau_{(330\ nm/1\ nm)}$, i.e. the transmission of a glass specimen with a thickness of 1 mm and at a wavelength of 330 nm. The transmission was determined before and after HOK-4 irradiation for 15 hours.

The table also shows the ability of glass A1 to form a fuse seal compared to glass 8253 produced by Schoft AG, a glass which has a very good ability to form a fuse seal with Mo, measured as the fused seal stress in nm/cm. The results show that there are virtually no stresses between the glasses, and consequently the glasses according to the invention are eminently suitable for forming a fused seal with molybdenum.

In the lamp test, the glasses according to the invention, which have coefficients of thermal expansion $\alpha_{20/300}$ of between $4.3 \cdot 10^{-6}$/K and $4.95 \cdot 10^{-6}$/K and transformation temperatures $T_g$ of greater than 775° C., again reveal their high thermal stability and their suitability for use as material for lamp bulbs having bulb temperatures of approx. 700° C.

Their resistance to reboiling is documented by reboil temperatures of at least 1450° C. The reboil temperature is the temperature at which a glass specimen, which is visually bubble-free at room temperature exhibits sudden formation of bubbles at the interface with a metal (specimen holder, Mo) when the temperature is increased. The higher this reboil temperature, the lower the likelihood of the glass forming bubbles when it forms a fuse seal with Mo.

The good crystallization stability of the glasses according to the invention is documented by the very low proportion of crystalline phase compared to the amorphous phase after long-term heat treatment (1130° C./115 h). Any devitrification crystals, which do form are cristobalite crystals (cf. exemplary embodiments), which are less likely to form streaks in the glass than if anorthite is formed (cf. comparative example), since, on the one hand, they grow more slowly and, on the other hand, they are easier to remove.

The good crystallization stability is also demonstrated by the fact that there is a temperature difference of approx. 100° C. between $V_A$ and UDT.

The glasses can be doped in such a manner that they have the desired transmission properties and a very good resistance to solarization. The good resistance to solarization is documented by the fact that there is no drop or only a slight drop in the transmission values when $\tau_{(330\ nm/1\ nm)}$ values before and after HOK-4 irradiation, i.e. irradiation with a Hg high-pressure lamp for 15 hours, are compared.

The disclosure in German Patent Application 10 2004 048 097.4 of Sep. 30, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in glass that withstands high temperatures for lamp bulbs and its uses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for is various applications without omitting features that, from the standpoint of prior art, fairly constitute essential characteristics of the generic or specific aspects of this invention.

What is claimed is new and is set forth in the following appended claims.

We claim:

1. An alumino-silicate glass for lamp bulbs that have molybdenum components, said glass containing alkaline earth metals and having a composition, in % by weight on an oxide basis, of:

| | |
|---|---|
| $SiO_2$ | >58-62 |
| $Al_2O_3$ | 15-17.5 |
| MgO | 0.1-<1 |
| CaO | 5.5-14 |
| SrO | 0-8 |
| BaO | 6-17 |
| $ZrO_2$ | 0-1 |
| $CeO_2$ | 0-0.3 |
| $TiO_2$ | 0-5 |
| $MoO_3$ | 0-2 |
| $Bi_2O_3$ | 0-4 |
| Σ RO | 11.6-29, | wherein RO is an alkaline earth metal oxide and said glass does not contain any $B_2O_3$.

2. An alumino-silicate glass for lamp bulbs that have molybdenum components, said glass containing alkaline earth metals and having a composition, in % by weight on an oxide basis, of:

| | |
|---|---|
| $SiO_2$ | 59-61 |
| $Al_2O_3$ | 15.3-17.2 |
| MgO | 0.2-<1 |
| CaO | >8-13.5 |
| SrO | 0-8 |
| BaO | >7-15 |
| $ZrO_2$ | 0.05-1 |
| $CeO_2$ | 0-0.3 |
| $TiO_2$ | 0-3 |
| $MoO_3$ | 0-2 |
| $Bi_2O_3$ | 0-4 |
| Σ RO | 21-26, | wherein RO is an alkaline earth metal oxide and said glass does not contain any $B_2O_3$.

3. The glass according to claim 1, having an alkali metal oxide content of <0.03% by weight and a water content of <0.02% by weight.

4. The glass according to claim 1, containing more than 10% by weight of BaO.

5. The glass according to claim 1, containing at least 0.5% by weight of MgO.

6. The glass according to claim 1, containing at least 0.5% by weight of $TiO_2$.

7. The glass according to claim 1, containing at least 0.005% by weight of $CeO_2$.

8. The glass according to claim 1, having a coefficient of thermal expansion, $\alpha_{20/300}$, of between $4.3 \cdot 10^{-6}$/K and $4.95 \cdot 10^{-6}$/K and a transformation temperature, $T_g$, of greater than 775° C.

9. A lamp bulb having a bulb temperature of greater than 650° C., said lamp bulb comprising an alumino-silicate glass, said glass containing alkaline earth metals and having a composition, in % by weight on an oxide basis, of:

| | |
|---|---|
| $SiO_2$ | >58-62 |
| $Al_2O_3$ | 15-17.5 |
| MgO | 0.1-<1 |
| CaO | 5.5-14 |
| SrO | 0-8 |
| BaO | 6-17 |
| $ZrO_2$ | 0-1 |
| $CeO_2$ | 0-0.3 |
| $TiO_2$ | 0-5 |
| $MoO_3$ | 0-2 |
| $Bi_2O_3$ | 0-4 |
| Σ RO | 11.6-29, | wherein RO is an alkaline earth metal oxide and said glass does not contain any $B_2O_3$.

* * * * *